E. M. BOYNTON,

Assignor to Wheeler, Madden & Clemson Manufacturing Co.

SAW-TANG.

No. 7,748. Reissued June 19, 1877.

Witnesses:

P. C. Dietrich

Wm. B. Uppenman.

Inventor:

Ebenezer M. Boynton

Per C. H. Watson & Co Attorneys.

N. PETERS, PHOTO-LITHOGRAPHER, WASHINGTON, D. C.

UNITED STATES PATENT OFFICE.

EBEN M. BOYNTON, OF GRAND RAPIDS, MICHIGAN, ASSIGNOR TO WHEELER, MADDEN & CLEMSON MANUFACTURING COMPANY.

IMPROVEMENT IN SAW-TANGS.

Specification forming part of Letters Patent No. 73,227, dated January 14, 1868; reissue No. 7,748, dated June 19, 1877; application filed June 1, 1877.

*To all whom it may concern:*

Be it known that I, EBEN M. BOYNTON, of Grand Rapids, in the county of Kent and State of Michigan, have invented certain new and useful Improvements in Saw-Tangs; and I do hereby declare that the following is a full, clear, and exact description thereof, that will enable others skilled in the art to which it appertains to make and use the same, reference being had to the accompanying drawings, and to the letters of reference marked thereon, which form a part of this specification.

This invention relates to crosscut-saw fastenings or tangs; and has for its object to provide such fastening that is simple in construction, efficient in use, and not liable to get out of repair, and by which means the saw-blade can readily be attached and detached, when desired, by means of a clamping-bolt and a socket, with a laterally-projecting arm, as will be hereinafter more fully described.

Figure 1:
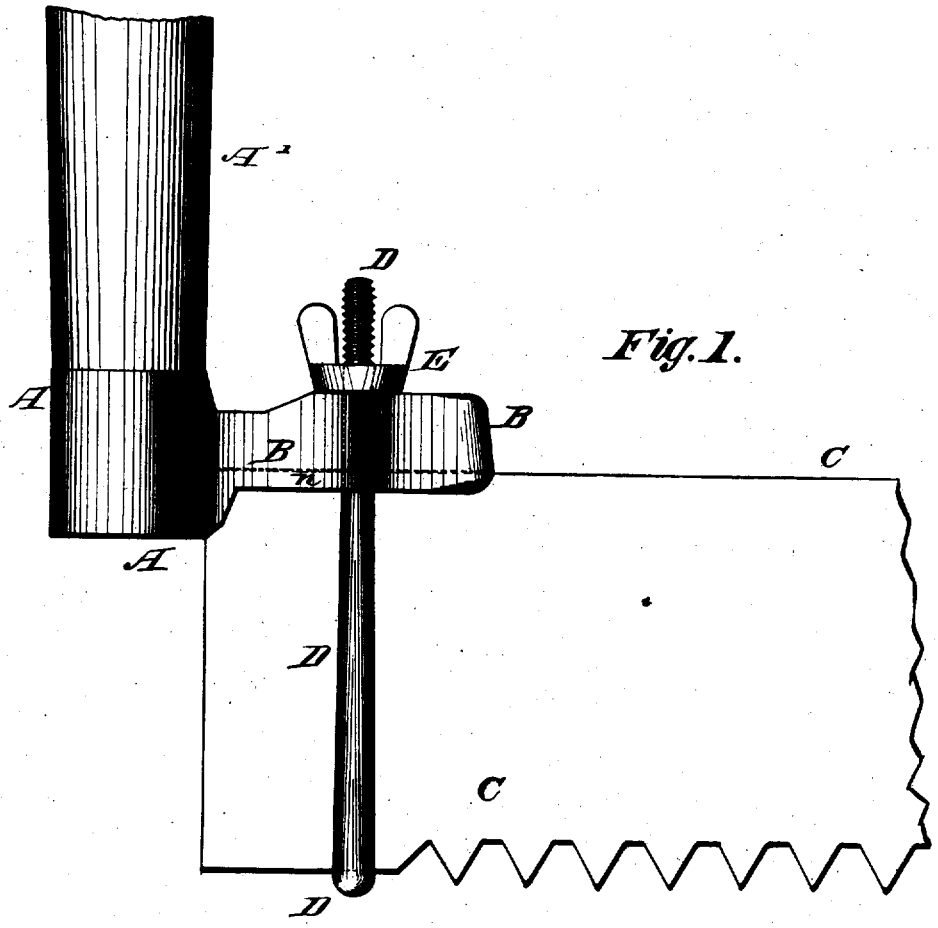
Figure 2:
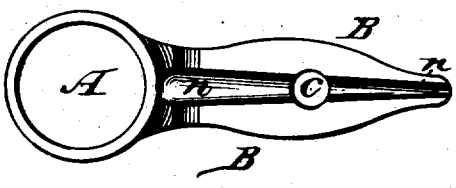
Figure 3:
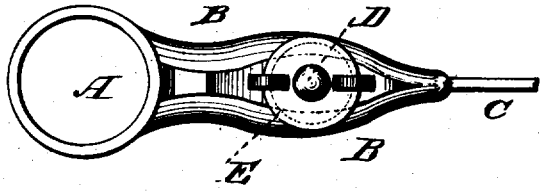
Figure 4:
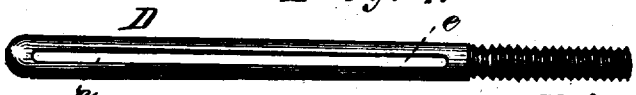

Referring to the drawing, Figure 1 is a side elevation of a portion of a saw with my improved tang applied. Fig. 2 is a bottom-plan view of the tang detached. Fig. 3 a top-plan view of the same, and Fig. 4 an edge view of the slotted bolt by which the socket is secured to the saw.

It is well known to those experienced in the business of using crosscut-saws that it frequently happens in sawing off logs, especially where the log happens to lie on uneven ground, the upper side of the cut made by the saw is forced together or closed in such a manner as to prevent the raising of the saw up out of the cut, and when this happens there is no means of removing the saw, except by raising the log, so as to open the cut, or by removing the handle and its sockets at one end of the saw, and then drawing the latter through endwise.

As these sockets or tangs are usually riveted fast to the saw, it is impossible to remove them without great difficulty and delay. To obviate these difficulties a variety of plans have been devised for so securing the socket that it can be detached from the saw, but as yet these devices have not fully answered the desired purpose.

A represents a socket, with an arm, B, projecting laterally from one side, as represented in Figs. 1, 2, and 3, the socket A being intended to receive the ordinary wooden handle A′ used with such saws.

In the under side of the arm or projection B a longitudinal groove, *n*, is formed, as represented in Fig. 2, and as indicated by dotted lines in Fig. 1, this groove being intended to fit upon the upper edge of the saw-blade when the socket is applied thereto, as represented in Fig. 1, the groove also extending down along the side of the socket A, as shown by the dotted lines.

D represents a bolt having a slit, *e*, in it of sufficient length to slip over the end of the saw, the upper end of the bolt D extending up through a hole, *c*, in the arm B, and having a thumb-nut, E, applied thereto, as represented in Fig. 1.

If desired, a notch may be cut in the under edge of the saw-blade C to receive the lower portion of the bolt D, where it passes around the blade, to prevent it from slipping thereon.

The manner of applying the device to the saw is fully shown in Fig. 1. It will be seen that when the socket is applied as there represented, the groove in the under side of the arm B prevents any lateral movement; and when the thumb-screw is tightened up, the whole is held tightly in place, and at the same time, by simply loosening the nut, the loop or bolt D, with the socket, can be quickly detached from the saw, and can be as quickly replaced.

By making the socket of malleable cast-iron, it can be cast ready for use, and thus furnished very cheaply. If desired, the bolt and nut may also be made of similar material, though these I prefer to make of wrought-iron.

Having thus fully described the invention, what is claimed as new, and desired to be secured by Letters Patent, is—

1. In combination with a saw-handle and saw-blade, a socket, provided with a laterally-projecting arm, and a clamping-bolt, substantially as and for the purpose set forth.

2. The detachable saw-tang, consisting of the socket A, with the arm B, having the groove *n* formed in its under side, in combination with the slotted bolt D and the thumb-nut E, substantially as described.

In testimony that I claim the foregoing I have hereunto set my hand this 26th day of May, 1877.

Witnesses: EBEN M. BOYNTON.
DARIUS FARRINGTON,
P. J. KEATING.